(12) United States Patent
Mutter

(10) Patent No.: US 11,424,951 B2
(45) Date of Patent: Aug. 23, 2022

(54) DEVICE AND METHOD FOR A TRANSMITTER/RECEIVER DEVICE OF A BUS SYSTEM

(71) Applicant: Robert Bosch GmbH, Stuttgart (DE)

(72) Inventor: Arthur Mutter, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 144 days.

(21) Appl. No.: 16/970,257

(22) PCT Filed: Feb. 20, 2019

(86) PCT No.: PCT/EP2019/054148
§ 371 (c)(1),
(2) Date: Aug. 14, 2020

(87) PCT Pub. No.: WO2019/162292
PCT Pub. Date: Aug. 29, 2019

(65) Prior Publication Data
US 2021/0083898 A1   Mar. 18, 2021

(30) Foreign Application Priority Data

Feb. 21, 2018   (DE) .......................... 102018202614.9

(51) Int. Cl.
*H04L 12/40* (2006.01)
*G06F 1/324* (2019.01)

(52) U.S. Cl.
CPC .. *H04L 12/40032* (2013.01); *H04L 12/40013* (2013.01); *H04L 12/4015* (2013.01);
(Continued)

(58) Field of Classification Search
CPC ......... H04L 12/40032; H04L 12/40013; H04L 12/40085; H04L 12/4015; G06F 1/324
See application file for complete search history.

(56) References Cited

U.S. PATENT DOCUMENTS 6,097,933 A * 8/2000 Bennett ............. H04W 52/0216
340/7.42
9,503,058 B1 * 11/2016 Cical ....................... G06F 1/324
(Continued)

FOREIGN PATENT DOCUMENTS

CN    103116322 A    5/2013
CN    103187925 A    7/2013
(Continued)

OTHER PUBLICATIONS

International Search Report for PCT/EP2019/054148, dated May 20, 2019.

*Primary Examiner* — Paul R. Myers
(74) *Attorney, Agent, or Firm* — Norton Rose Fulbright US LLP; Gerard Messina

(57) ABSTRACT

A device and a method for a transmitter/receiver device of a bus system are provided. The device has a measuring unit for measuring a minimum recessive bit time that occurs during an operation of the bus system in a message received by the device from a bus of the bus system, a voltage state of the message having been actively driven by a transmitter/receiver device of one of at least two user stations of the bus system; a calculation unit for calculating a power-on period on the basis of the minimum recessive bit time supplied by the measuring unit, the power-on period being a time period for which an oscillation reduction unit is to be switched on, which is used for reducing oscillations on the bus that occur after a transition between different voltage states of a bus signal transmitted on the bus.

12 Claims, 3 Drawing Sheets

(52) U.S. Cl.
CPC .............. *H04L 12/40084* (2013.01); *H04L 2012/40215* (2013.01); *H04L 2012/40241* (2013.01)

(56) References Cited

U.S. PATENT DOCUMENTS

| | | | | |
|---|---|---|---|---|
| 2014/0075177 | A1* | 3/2014 | Sugitachi | G06F 1/3228 |
| | | | | 713/2 |
| 2014/0156893 | A1 | 6/2014 | Monroe et al. | |
| 2016/0004292 | A1* | 1/2016 | Sharda | G06F 13/4022 |
| | | | | 710/317 |
| 2016/0360594 | A1* | 12/2016 | Chemel | H05B 47/19 |
| 2017/0342948 | A1* | 11/2017 | Tonkin | F02M 31/13 |
| 2018/0345888 | A1* | 12/2018 | Lounnas | B60R 16/033 |

FOREIGN PATENT DOCUMENTS

| | | |
|---|---|---|
| CN | 106063128 A | 10/2016 |
| CN | 106063198 A | 10/2016 |
| DE | 112016003984 T5 | 7/2018 |
| EP | 3214803 A1 | 9/2017 |
| JP | 2015043512 A | 3/2015 |
| JP | 2016527778 A | 9/2016 |
| JP | 2017050839 A | 3/2017 |
| JP | 2017216579 A | 12/2017 |

\* cited by examiner

DEVICE AND METHOD FOR A TRANSMITTER/RECEIVER DEVICE OF A BUS SYSTEM

The present invention relates to a device and to a method for a transmitter/receiver device of a bus system. The device and the method are developed in such a way that a power-on period for a function by which a reduction of the oscillation tendency during a transition between different bit states of a bus signal is achievable is dynamically adaptable.

BACKGROUND INFORMATION

In a message or data transmission in a bus system, information included in bytes or bits of the messages or data is represented by different bit states or voltage states. The different bit states entail different bus states during the transmission of the message via a bus of the bus system. Depending on the bus system, different transmission protocols exist for a message or data transmission.

In the CAN bus system, for example, messages are transmitted using the CAN and/or CAN FD protocol as it is described in the ISO-11898-1:2015 standard as the CAN protocol specification with CAN FD. At present, the CAN bus system is widely used for the communication between sensors and control units. The CAN bus system is often used in vehicles or automation systems etc. for a communication between the individual bus users.

In the CAN/CAN-FD communication, in particular, the transmitter/receiver devices, which are also known as transceivers, have to be able to operate the bus in a low-resistance manner in order to produce a dominant bus state or bit state as one of the two different bus states or bit states.

In the recessive state as the other of the two different bus states, on the other hand, the transmitter/receiver devices are high-resistance transmitter/receiver devices.

Depending on the bus topology, the length of the stubs or stub-end feeders, the position and the number of termination resistors, the transition from dominant to recessive causes an oscillation tendency. This is a great disadvantage in the system configuration because the bit time must therefore last until the oscillation is sufficiently damped. If the bit time is too short and the recessive state is therefore not stable, the transmitter/receiver device may erroneously detect a dominant state. A compliance with the maximally permissible error quote of the transmitter/receiver device thus requires a longer bit time. This causes an undesired reduction of the bit rate.

To solve this problem, it is possible to intermittently connect a resistor RRSC between the two bus signals CAN_H and CAN_L following a detected edge from the dominant to the recessive bus level, which corresponds to the falling edge of a differential signal Vdiff=CAN_H−CAN_L, and to remove the resistor again after a predefined time.

However, depending on the actually prevailing system conditions, it is problematic that the length of a recessive bit may shrink to a fraction of the nominal bit length nevertheless. As a result, for instance, a large bit asymmetry comes about in a CAN bus system in which a recessive bit is considerably shorter than a dominant bit.

SUMMARY

It is an object of the present invention to provide a device and a method for a transmitter/receiver device of a bus system, which solve the aforementioned problems. In accordance with example embodiment of the present invention, a device and a method for a transmitter/receiver device of a bus system are to be provided by which a reduction of an oscillation tendency during the transition between different bit states of voltage states, in particular an oscillation tendency during the transition from the dominant to the recessive state in a bus system, is able to be realized for all operating states of the bus system.

The object may be achieved by a device in accordance with an example embodiment of the present invention. The device includes a measuring unit for measuring a minimum recessive bit time that occurs during an operation of the bus system in a message received by the device from a bus of the bus system, a voltage state of the message having been actively driven by a transmitter/receiver device of one of at least two user stations of the bus system; a calculation unit for calculating a power-on period on the basis of the minimum recessive bit time supplied by the measuring unit, the power-on period being a time period for which an oscillation reduction unit is to be switched on, which is used for reducing oscillations on the bus that occur after a transition between different voltage states of a bus signal transmitted on the bus, and the measuring unit being developed to carry out the measuring during an ongoing operation of the bus system, and the calculation unit being developed to subsequently perform the calculating during an ongoing operation of the bus system in order to reduce the oscillations on the bus by a dynamic adaptation of the power-on period.

With the aid of the described device, the duration of a recessive bit is able to be measured and evaluated such that measures for suppressing the oscillation tendency are able to be selectively set. Toward this end, a measure for what is known as a ringing suppression or a reduction of the oscillation tendency during the transition of the bus signal between different voltage states, in particular from a dominant to a recessive state, is able to be initiated in a time-variable manner depending on the requirement. In particular the power-on period for the reduction of the oscillation tendency is dynamically adaptable to the respective actually prevailing operating conditions of the bus system. For instance, such operating conditions which influence the duration of a recessive bit in the bus system and are able to be compensated by the device are different bit rates during different transition phases in the bus system such as the different bit rates in the arbitration phase and the data phase of a CAN FD frame, the physical layer of the CAN bus (transceiver or transmitter/receiver device, bus topology, terminating resistors, etc.);

the voltage and temperature;

the oscillator tolerance of a transmitting bus user or a deviation in the frequency of a clock signal from its nominal value, the clock signal in the transmitting bus user being used to generate a transmit signal TX signal for the transmitter/receiver device or the transmit transceiver.

In that way, the example device is able to optimize the receiving of messages in a transmitter/receiver or transceiver of a user station of a bus system for the operating conditions or conditions that prevail in the bus system. As a result, an increase in the bit rates, in particular in the data region of a message, is possible at a good reception quality. The transmission rate or transmission speed of the messages in the bus system is therefore able to be increased in comparison with a case where the device is not used.

In addition, the example device allows for more freedom in the configuration of bus topologies and/or of terminations and/or stubs and/or the number of nodes or user stations of the bus system. In particular, modifications of the bus topology are easily able to be compensated by the device without having to exchange a component for the ringing suppression or the reduction of the oscillation tendency as a result of the modification of the bus topology. The device ensures that the oscillation reduction after a transition of the bus signal between different voltage states, in particular from a dominant to a recessive state, operates in an ideal manner at all times.

The example device is suitable for all transmitter/receiver devices of communications system in which a bus state or a voltage state is actively driven, such as in particular in a CAN bus system, a CAN-HS system, a CAN-FD bus system, etc. In a CAN-HS bus system (HS=highspeed), a data transmission rate of up to 1000 kBit per second (1000 kbps) is possible. In a CAN-FD bus system, a data transmission rate of more than 1 Mbit per second (1 Mbps) is possible.

Advantageous further developments of the device in accordance with the present invention are described herein.

The measuring unit may possibly be developed to measure the minimum recessive bit time in a continuous manner or at predefined intervals.

According to one example embodiment, the measuring unit is developed to carry out a plausibility check of the measured minimum recessive bit time.

According to another example embodiment, it is possible to develop the measuring unit to determine the bus loading in order to check whether or not a measured minimum recessive bit time is plausible.

The measuring unit may be developed to provide a minimum recessive bit time for the calculation unit, which is selected as a function of which one of the user stations has won an arbitration on the bus.

Additionally or alternatively, it is possible that the measuring unit is developed to have a value available for the minimum recessive bit time in the event that the user station transmits itself, and to have a value available for the minimum recessive bit time in the event that another one of the user stations of the bus system transmits, or that the measuring unit is developed to have a minimum recessive bit time available for each of the communications relations to the user stations of the bus system.

In addition or as an alternative, it is also possible that the measuring unit is developed to have a separate value available for the minimum recessive bit time for each identifier transmitted on the bus of the bus system.

According to a further embodiment variant of the present invention, the measuring unit may additionally or alternatively be developed to have a minimum recessive bit time available for at least two communications phases of a message and to forward it to the calculation unit.

The previously described device may be part of a user station for a bus system, which furthermore has a transmitter/receiver device for transmitting a signal to the bus of the bus system, the transmitter/receiver unit being developed to actively drive a state of the signal, and it also has an oscillation reduction unit for reducing oscillations on the bus that occur after a transition between different voltage states of a bus signal that forms on the bus, the device being developed to output the ascertained time period to the oscillation reduction unit so that the oscillation reduction unit is switched on for the ascertained time period. The device is possibly developed so that the oscillation reduction unit is activated only when the transmitter/receiver device transmits a message to the bus.

The previously described user station may be part of a bus system, which has a bus and at least two user stations, which are connected to each other via the bus in such a way that they are able to communicate with each other. Here, at least one of the at least two user stations is a previously described user station.

The previously mentioned object is furthermore achieved by an example method in accordance with the present invention for reducing an oscillation tendency during the transition between different bit states. The example method includes the steps: measuring, with the aid of a measuring unit of a device for the transmitter/receiver device, a minimum recessive bit time that occurs during the operation of the bus system in a message received by the device from a bus of the bus system, a voltage state of the message having been actively driven by a transmitter/receiver device of one of at least two user stations of the bus system; calculating, with the aid of a calculation unit of the device, a power-on period on the basis of the minimum recessive bit time supplied by the measuring unit, the power-on period being a time period for which an oscillation reduction unit is to be switched on, which is used for reducing oscillations on the bus that occur after a transition between different voltage states of a bus signal transmitted on the bus, and the measuring unit carrying out the measuring during an ongoing operation of the bus system, and the calculation unit subsequently carrying out the calculating during an ongoing operation of the bus system in order to reduce the oscillations on the bus by a dynamic adaptation of the power-on period.

The present method offers the same advantages as mentioned earlier with reference to the device.

Additional possible implementations of the present invention include also not explicitly mentioned combinations of features or embodiments described in the previous or the following text with regard to the exemplary embodiments. Based on the description herein, one skilled in the art will also add individual aspects as improvements or supplementations to the respective basic form of the present invention.

BRIEF DESCRIPTION OF THE DRAWINGS

Hereinafter, the present invention will be described in greater detail with reference to the figures and on the basis of exemplary embodiments.

Unless otherwise specified, identical or functionally equivalent elements in the figures have been provided with the same reference numerals.

DETAILED DESCRIPTION OF EXAMPLE EMBODIMENTS

Figure 1:
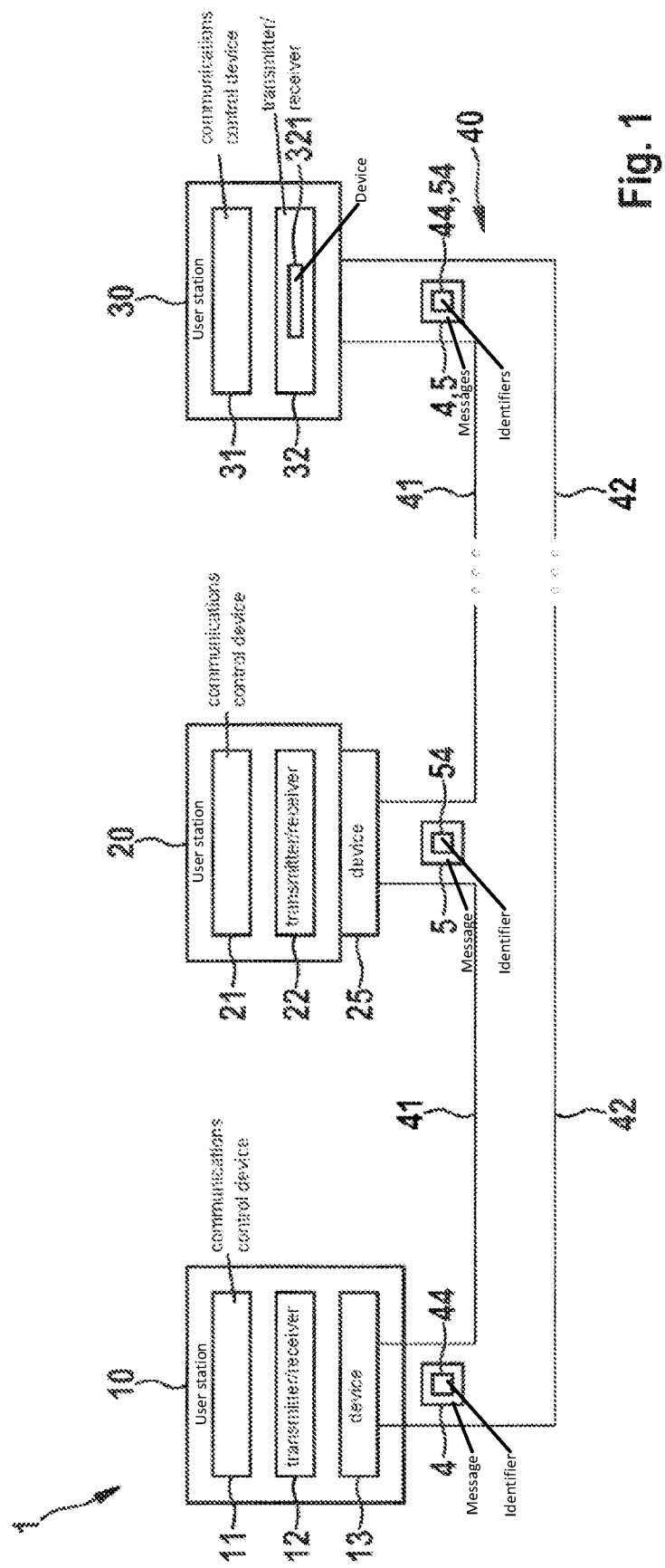
FIG. 1 shows a simplified block diagram of a bus system according to a first exemplary embodiment of the present invention.

FIG. 1 shows a bus system 1, which, for instance, is at least partly a bus system in which at least one bus state or voltage state is actively driven. Such a bus system 1 is particularly a CAN bus system, a CAN-FD bus system, etc., to which reference is made in the following text in order to describe the principle of the present invention. Bus system 1 can be used in a vehicle, in particular a motor vehicle, an airplane, etc. or in a hospital, etc. However, bus system 1 is not restricted to such a use. In general, bus system 1 is any serial bus system in which a bit asymmetry may occur under real operating conditions, in which the time period of a dominant bus state differs from the time period of a recessive bus state.

In FIG. 1, bus system 1 has a multitude of user stations 10, 20, 30, each being connected to a bus 40 by a first bus wire 41 and a second bus wire 42. In a CAN bus system, bus wires 41, 42 are also called CAN_H and CAN_L and are used for the electrical signal transmission after the coupling of the dominant levels or the generation of recessive levels for a signal in the transmit state. Via bus 40, messages 4, 5 are able to be transmitted between the individual user stations 10, 20, 30 in the form of signals. Message 4 has an identifier 44 (in ISO11898-1:2015 denoted as CAN identifier), which uniquely identifies the particular user station 10 or 20 that has sent message 4. Message 5 has an identifier 54, which uniquely identifies the particular user station 20 or 30 that has sent message 5. User stations 10, 20, 30 are control devices or display devices of a motor vehicle, for instance.

As illustrated in FIG. 1, user station 10 has a communications control device 11, a transmitter/receiver device 12, and a device 13. In contrast, user station 20 has a communications control device 21 and a transmitter/receiver device 22, a device 25 being connected to user station 20. User station 30 has a communications control device 31 and a transmitter/receiver device 32 including a device 321.

Communications control devices 11, 21, 31 are used for the control of a communication of individual user station 10, 20, 30 via bus 40 with another user station of user stations 10, 20, 30 connected to bus 40. Communications control device 11 may particularly be developed like a conventional CAN controller. In particular, communications control device 21 is able to be developed like a conventional CAN-FD controller. Communications device 31 may particularly be developed like a conventional CAN-FD controller and/or CAN controller.

Transmitter/receiver devices 12, 22, 32 are used for transmitting messages 4 or 5 in the form of signals and for this purpose utilize the respective allocated device 13, 25, 321 as will be described in greater detail in the following text. Transmitter/receiver device 12 may particularly be developed in the way of a conventional CAN transceiver. Transmitter/receiver device 22 may particularly be developed like a conventional CAN-FD transceiver. Transmitter/receiver device 32 may particularly be developed like a conventional CAN transceiver and/or CAN-FD transceiver, at least as far as its functionality is concerned.

Devices 13, 25, 321 have the same function in each case, as described in the following text by way of example just for device 13 for the sake of simplicity. In addition, devices 13, 25, 321 are interchangeable. As a result, devices 13, 25, 321 are not restricted to the special design indicated in FIG. 1 as one special example.

Figure 2:
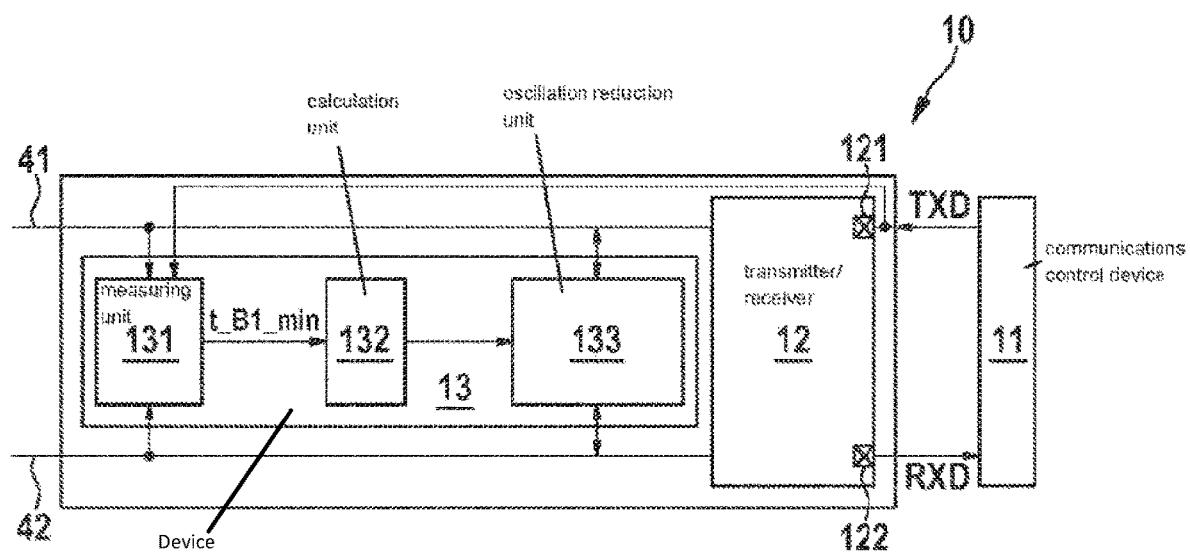
FIG. 2 shows a simplified electrical circuit diagram of a user station of the bus system having a device for a transmitter/receiver device according to the first exemplary embodiment of the present invention.

Devices 13, 25, 321 and transmitter/receiver devices 12, 22, 32 are directly connected to bus 40 in each case, as illustrated in greater detail in FIG. 2 for device 13.

FIG. 2 shows the basic structure of transmitter/receiver device 12 having device 13. Transmitter/receiver device 12 and device 13 are connected to bus 40, or to be more precise, to its first bus wire 41, which serves as bus system 1 for CAN-H in a CAN bus system, and to its second bus wire 42, which serves as bus system 1 for CAN_L in the CAN bus system.

In addition, transmitter/receiver device 12 has a connection 121 for a transmit signal TxD, which is generated by communications control device 11 with a predefined transmission clock and input into transmitter/receiver device 12 at connection 121. In the example of a CAN bus system as bus system 1, transmitter/receiver device 12 converts transmit signal TxD into differential signals CAN_H and CAN_L for bus wires 41, 42 in the conventional manner. Differential signals CAN_H and CAN_L on bus 40 form a bus signal, which is able to be received by respective user stations 10, 20, 30.

Transmitter/receiver device 12 then forwards the signal received from bus 40 at a connection 122 to communications control device 11 as a receive signal RxD.

According to FIG. 2, device 13 has a measuring unit 131, a calculation unit 132 and an oscillation reduction unit 133. Oscillation reduction unit 133, for example, is embodied as a resistor, which is intermittently connected between first and second bus wire 41, 42 as previously described. Oscillation reduction unit 133, however, may be developed in any other manner as long as it compensates for a bit asymmetry of the signal on bus 40. In particular, oscillation reduction unit 133 induces a change in a CAN bus system, in particular a prolongation, of bit duration t_B1 of a recessive bit, as illustrated on the basis of FIGS. 3 to 4 and described in greater detail in the following text.

Figure 3:
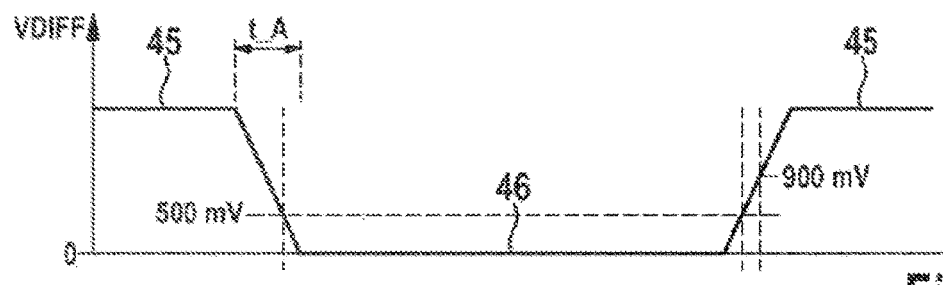
FIG. 3 shows a time characteristic of a differential bus signal VDIFF of bus signals CAN_H and CAN_L in the transmitter/receiver device according to the first exemplary embodiment of the present invention.
Figure 4:
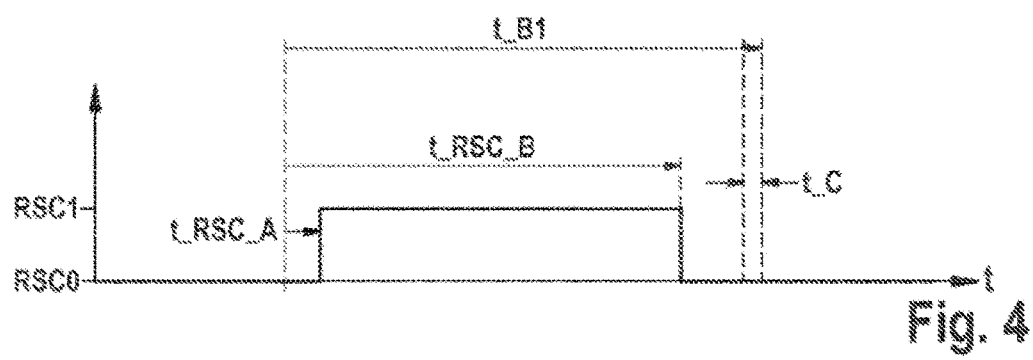
FIG. 4 shows the time scenario for a power-on/power-off circuit of an oscillation reduction unit after a transition of the differential bus signal VDIFF of FIG. 3 from a dominant bus state to a recessive bus state with the device from FIG. 2.

FIG. 3 shows in connection with FIG. 4 the effect of the circuit of FIG. 2 on the basis of the differential bus signal, i.e., differential voltage VDIFF=CAN_H−CAN_L over time t. In the example of FIG. 3, the bus signal, and thus differential voltage VDIFF, changes from a dominant bit to a recessive bit and back again to a dominant bit, or from a bit having a dominant bus state 45 to a bit having a recessive bus state 46, and then back again to a bit having a dominant bus state 45. The bus signal, and thus differential voltage VDIFF in the example of FIG. 3, thus has recessive bus state 46 for the duration of a bit t_B1. As may be gathered from FIG. 3, differential voltage VDIFF requires a predefined time period t_A to actually change from dominant bus state 45 to recessive bus state 46 after the switchover from a dominant bus state 45 to a recessive bus state 46. Once differential voltage VDIFF has attained a value of 500 mV, which corresponds to the receiving threshold of transmitter/receiver device 12 in the example of FIG. 3, transmitter/receiver device 12 detects recessive bus state 46. Once differential voltage VDIFF has reached a value of 900 mV, transmitter/receiver device 12 detects dominant bus state 45. After the switchover from a recessive bus state 46 to a dominant bus state 45, differential voltage VDIFF requires a predefined time period t_C to rise from the mentioned value or the lower voltage threshold of 500 mV to the mentioned value or the upper voltage threshold of 900 mV so that transmitter/receiver device 12 detects the change from recessive bus state 46 to dominant bus state 45.

With the aid of measuring unit 131 and calculation unit 132, device 13 is developed in such a way that oscillation reduction unit 133 is switched on after a time period t_RSC_A has elapsed, which is shown in FIG. 4. Time period t_RSC_A begins with a drop below the lower receiving threshold of 500 mV. With the aid of measuring unit 131 and calculation unit 132, device 13 is additionally developed to switch off oscillation reduction unit 133 again after a time period t_RSC_B has elapsed. Since time period t_RSC_B according to FIG. 4 also begins with a drop below the lower receiving threshold of 500 mV of transmitter/receiver device 12, oscillation reduction unit 133 is therefore switched on for a time period T=t_RSC_B−t_RSC_A.

Device 13 determines the setting of time periods t_RSC_A and t_RSC_B with the aid of measuring unit 131 and calculation unit 132. Time period t_RSC_A is ideally 0 in most cases, but is able to be selected as >O for the special optimization or due to the signal propagation times in the implementation existing for bus system 1. Time period t_RSC_B depends on the minimum time length of a recessive bit that occurs during the operation of bus system 1 on bus 40.

In device 13, measuring unit 131 measures the minimum length of time or time period tBitBus(rez)_min of a recessive bit that occurs during the operation of bus system 1 on bus 40. This minimum length of time or time period tBitBus(rez)_min of a recessive bit on bus 40 is denoted as time period t_B1_min in the following text. In a special example, time period t_B1_min may particularly be equal to time period t_B1 shown in FIG. 4. Measuring unit 131 measures and determines minimum recessive bit time t_B1_min on a continuous basis or at predefined intervals.

For the determination of the minimum length of time or minimum time period tBitBus(rez)_min of a recessive bit on bus 40 or time period t_B1_min, measuring unit 131 measures the length of time or the time period of all recessive sequences, that is to say, the respective time periods t_B1, during the operation of bus system 1. On that basis, measuring unit 131 ascertains the shortest length of time or time period of a recessive bit, and thus minimum time period t_B1_min. Different methods for plausibilizing the measurement are optionally able to be used during the ascertainment. Measuring unit 131 forwards only plausible values for time period t_B1_min to calculation unit 132 as the next unit.

For example, measuring unit 131 determines a value for time period t_B1_min as plausible if the value has been measured multiple times. A predefined tolerance band within which the value for time period t_B1_min may lie in order to be deemed "measured multiple times" is able to be defined in measuring unit 131.

In addition, a comparison with the last valid value for time period t_B1_min helps in filtering out invalid values with a high degree of probability and thus in determining the measured value for time period t_B1_min as plausible. This specifically means that a value that is too short for time period t_B1_min at which a brief reversal of the bus level occurs due mostly to external interruptions, is able to be detected as a glitch and filtered out. In addition, a value that is too long for time period t_B1_min as a measured sequence of two recessive bits is able to be detected and filtered out when by chance no individual recessive bit is transmitted for a certain period of time.

Additionally or alternatively, measuring unit 131 may determine a value for time period t_B1_min as plausible if the measured value or actual value for time period t_B1_min is greater than or equal to a lower limit value for time period t_B1_min. The lower limit value for time period t_B1_min is able to be determined from the maximum bit rate that is used in bus system 1. In particular, the maximum bit rate used in bus system 1 may be the maximum bit rate of a CAN FD data phase. This maximum bit rate may not become randomly high.

The lower limit value for time period t_B1_min makes it possible to unequivocally filter out glitches in environments experiencing great interference. For example, only CAN transceivers or transmitter/receiver devices having up to 5 Mbit/s are currently standardized in the ISO11898-2:2016 standard. A normal bit time thus has a length of 200 ns. In this example, in particular 30% of the bit time 0.3*200 ns=60 ns is definable as the lower limit value for time period t_B1_min. In this case, a time period t_B1_min>60 ns would always be reported to calculation unit 132 as the next following unit.

Depending on the requirement, measuring unit 131 may be initialized in such a way that after being switched on, measuring unit 131 initially starts from a very low, very high or a typical value for t_B1_min.

Measuring unit 131 is optionally developed so that it recognizes a time period t_B1_min forwarded as valid for only a certain time (timeout). In this case, measuring unit 131 increases the previous time period t_B1_min to an instantaneous, measured value if no recessive sequence, i.e., time period t_B1, that is as short as previous time period t_B1_min is measured for a certain time. This makes it possible to follow the changing marginal conditions which, for instance, come about on account of a voltage change and/or a temperature change and/or a bit rate change and/or the oscillator tolerance, etc.

In device 13, one of the mentioned variants for the measurement and the as-plausible determination of time period t_B1_min is able to be fixedly set or provided in any combination. Alternatively, one of the mentioned variants or combinations is able to be selected and may then be set during the configuration of device 13 or user station 10.

On the basis of time period t_B1_min measured and forwarded by measuring unit 131, calculation unit 132 calculates the adjustment parameter or time period t_RSC_B for oscillation reduction unit 133. The calculation is able to be performed after receiving a time period t_B1_min. In this context, calculation unit 132 takes into account that the following always applies: t_RSC_B<t_B1_min. In this way, a safety reserve is available, which prevents time period t_RSC_B from extending into the next dominant bit. Toward this end, for example, calculation unit 132 may calculate time period t_RSC_B as t_RSC_B=0.7*t_B1_min, which is a suitable value for a CAN bus system for the following reasons. Depending on bus system 1, however, factors other than the factor 0.7 are selectable.

If bus system 1 is a CAN bus system, calculation unit 132 takes into account that the CAN protocol requires a certain time period t_CLK at the end of a bit in order to handle the oscillator tolerance of the "CAN clock" or the CAN clock signal that exits in CAN bus systems. This certain or predefined time period is 0.3*t_B1_min, for example. Oscillation reduction unit 133 must not be switched on during this time period t_CLK because the bit is already sampled here and an oscillation after the bus state change must therefore have already subsided. For this reason, time period t_RSC_B in the above example was calculated as t_RSC_B=0.7*t_B1_min.

Calculation unit 132 forwards calculated adjustment parameter t_RSC_B for the power-on of oscillation reduction unit 133 to oscillation reduction unit 133. As a result, oscillation reduction unit 133 is switched on for a period of time that corresponds to calculated time period t_RSC_B, which is illustrated in FIG. 4. Oscillation reduction unit 133 thus always operates in an ideal manner because time period t_RSC_B is adapted to the current operating conditions that result from the actual bit length of the recessive bits, i.e., the bits having bit state 46.

In the described exemplary embodiment of the present invention, all user stations 10, 20, 30 have the functionality of one of devices 13, 25, 321 for the allocated transmitter/receiver device 12, 22, 32. It is alternatively possible to provide devices 13, 25, 321 only for user stations or nodes of bus system 1 that have a high oscillation tendency. The high oscillation tendency of user stations 10, 30 may in particular result from their position in bus system 1, the position of terminating resistors 49, the stub length or stub-end feeder length to user stations 10, 30, etc.

A method for reducing an oscillation tendency during the transition between different bit states is therefore carried out with the aid of devices 13, 25, 321. In addition, a method is executed which dynamically adapts the reduction of an oscillation tendency during the transition between different bit states to the existing, actual operating conditions of bus system 1 in each case.

According to a further modification of the first exemplary embodiment, the previously described functionality of at least one of devices 13, 25, 321 is active only if the allocated transmitter/receiver device 12, 22, 32 itself is transmitting or acting as transmitter.

In the previously described ways, an optimized oscillation reduction is able to be achieved after the change or transition of a bus signal or signal VDIFF from dominant bus state 45 to recessive bus state 46. This greatly reduces the likelihood of t_RSC_B extending into a following dominant bit. Because of the dynamic adaptation of power-on period r_RSC_B, it is also not necessary to first select oscillation reduction unit 133 for a special bit rate of bus system 1; instead, oscillation reduction unit 133 is able to be used for all bit rates. This means that fewer different oscillation reduction units 133 have to be provided, which reduces the costs for the oscillation reduction because of the higher lot sizes for one and the same component.

Figure 5:
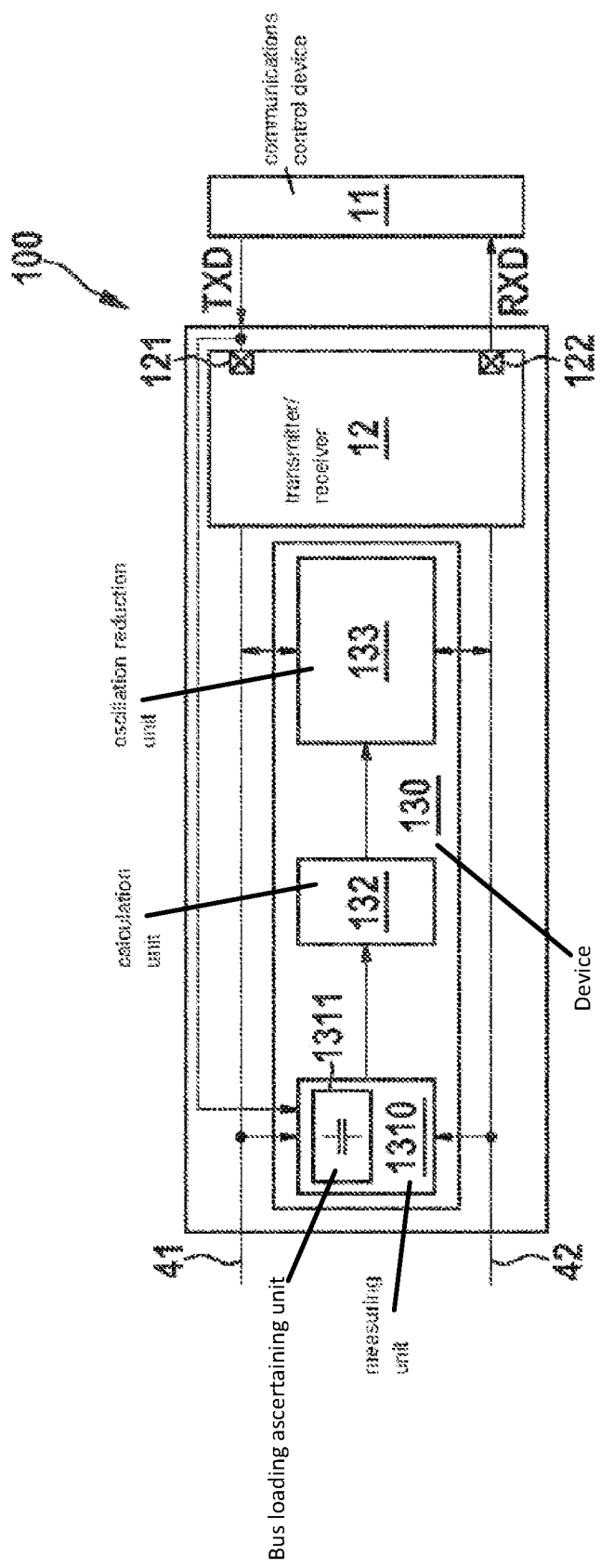
FIG. 5 shows a simplified electrical circuit diagram of a user station of the bus system having a device for a transmitter/receiver device according to a second exemplary embodiment of the present invention.

FIG. 5 shows a user station 100 according to a second exemplary embodiment, which may be used in addition or as an alternative to a user station 10. User station 100 has a device 130 provided with a measuring unit 1310, which has a bus loading ascertainment unit 1311 in order to consider the bus loading on bus 40 in bus system 1. This makes it possible to achieve an even better oscillation reduction after the change of a bus signal from dominant bus state 45 to recessive bus state 46. With the exception of the differences described in the following text, bus system 1 and device 130 have the same design as previously described in connection with the preceding exemplary embodiment or its modifications for bus system 1 and device 13.

Measuring unit 1310 ascertains the bus loading through a measurement or an estimate. Measuring unit 1310 then adapts the timeout time period to the bus loading. For instance, the measurement of the bus loading could be performed via the relationship of the duration of the observed recessive bus states 46 to the duration of the observed dominant bus states 45. If it is assumed that the individual bits in a frame or a message 4, 5 may assume 0 or 1 at the same probability, then the bus level is balanced on average within a frame or a message 4, 5. In other words, there are as many dominant as there are recessive bus states 45, 46. If no CAN frames or no messages 4, 5 are transmitted, then a recessive bus state 46 is present.

For this purpose, measuring unit 1310 has the capacitor as bus loading ascertainment unit 1311 including the corresponding wiring, so that a recessive bus state 46 charges the capacitor as bus loading ascertainment unit 1311 and a dominant bus state 45 discharges the capacitor. The bus loading is then able to be derived from the charge state of the capacitor.

According to a modification of the second exemplary embodiment, the capacitor of bus loading ascertainment unit 1311 having the corresponding wiring for ascertaining the bus loading is situated externally from measuring unit 1310. In this case, the bus loading is determined by a separate unit other than measuring unit 1310.

As an alternative, the capacitor of bus loading ascertainment unit 1311 may be replaced by a digital implementation with the aid of a counter. In such a case, the counter of bus loading ascertainment unit 1311 would be incremented at a predefined clock based on a recessive bus state 46 and decremented based on a dominant bus state 45.

According to a further modification of the second exemplary embodiment, measuring unit 1310 considers the bus loading in that measuring unit 1310 alternatively or additionally detects the long recessive idle sequences between two frames or messages 4, 5. A recessive idle sequence occurs when no signal is transmitted on bus 40 and recessive bus state 46 thus is present. As a result, measuring unit 1310 or the other separate unit adapts the timeout time in that measuring unit 1310 or another separate unit stops in particular the timeout during a recessive idle sequence.

According to a third exemplary embodiment, measuring units 131, 1310 according to the previous exemplary embodiments consider the number of user stations N for determining time period t_B1_min and the adjustment parameter or time period t_RSC_B for oscillation reduction unit 133. With the exception of the differences described in the following text, bus system 1 and devices 13, 130 have the same design as described in the previous text according to the preceding exemplary embodiment or its modification for bus system 1.

With a number of N user stations 10, 20, 30 in bus system 1, each user station 10, 20, 30 receives a signal from N user stations 10, 20, 30, N being a natural number. In the example of FIG. 1, user station 10 of N=3 user stations is able to receive something, i.e., user station 10 is able to receive something from user station 20, user station 10 is able to receive something from user station 30, and user station 10 is able to receive its own transmit signal. Quite generally, a user station N of N−1 user stations is able to receive something as receive signal RxD, and user station N is able to receive its own transmit signal TxD as receive signal RxD. In all of these N communications relations, user station N experiences different time periods t_B1 or lengths of recessive bits because the transmitter is a different one each time.

Therefore, the following options are adjustable on measuring units 131, 1310 according to the preceding exemplary embodiments, either at the factory or during the configuration of bus system 1. Combinations of the following options are also possible.

According to a first option, measuring unit 131 or 1310 has two values available in a memory for t_B1_min, i.e., a value t_B1_min 1 in the event that user station N transmits itself, and a value t_B1_min 2 in the event that another of the N user stations transmits. As an alternative, the values for t_B1_min are able to be made available in a further block, in particular a memory, which is not shown.

The distinction whether user station N itself or some other user station is transmitting is able to be derived from the digital TxD signal. Thus, measuring unit 131 outputs a t_B1_min for the value t_RSC_B for calculation unit 132, which is selected as a function of which one of user stations 10, 20, 30 or N is transmitting, that is to say, user station 10 itself or one of the other user stations 20, 30 of bus system 1, for instance.

According to a second option, measuring unit 131 or 1310 has a time period t_B1_min available for each of the communications relations, i.e., N time periods t_B1_min. The communications relations are able to be ascertained with the aid of identifiers 44, 54 of a message 4, 5, which are also known as frame identifiers (frame ID) and are individually used for each user station 10, 20, 30 in transmitted message 4, 5. With the aid of a configuration in measuring unit 131 or 1310, in which it is stipulated which user station 10, 20, 30 transmits using which particular identifier 44, 54, and with the aid of a CAN protocol controller such as communications control devices 11, 21, 31, it is possible at all times to unequivocally identify the communications relationship.

If measuring unit 131 or 1310 is unable to be configured in the aforementioned second option, or if the outlay or the possible provision of the configuration is to be omitted, it is possible according to a third option that measuring unit 131 or 1310 has a separate value available for t_B1_min for each identifier 44, 54 transmitted on this bus system 1. The number of identifiers 44, 54 typically used on a bus system 1 is considerably smaller than the number of possible identifiers 44, 54. The number of possible identifiers 44, 54 corresponds to the number that is maximally encodable by the number of bits provided for the coding of identifier 44, 54 in respective message 4, 5. This approach of having only the number of identifiers 44, 54 available that is typically used on a bus system 1 is already sufficient for most application cases when a small memory is used, e.g., for 100 value pairs of identifiers 44, 54 and time period t_B1_min.

According to a fourth option, measuring unit 131 or 1310 may have a time period t_B1_min_A available for the arbitration phase and a time period t_B1_min_B for the data phase during which shorter bits are transmitted than in the arbitration phase on account of the higher bit rate. This option is able to be combined with the previously mentioned options. In the arbitration phase, all user stations 10, 20, 30, 100 are initially able to transmit to bus 40 at the same time in order to negotiate which one of user stations 10, 20, 30, 100 has to transmit the most important message 4, 5 and thus receives the next exclusive, collision-free access to bus 40 for the duration of the transmission of message 4, 5. Ideally, the availability of time periods t_B1_min_A for the arbitration phase and t_B1_min_B for the data phase is implemented for every one of the N communications relations. However, it is also possible to provide only one time period t_B1_min_A for the arbitration phase and one time period t_B1_min_B for the data phase. The detection of the two cases (arbitration phase and data phase) may be carried out using a CAN protocol controller.

In this way, a still further improved oscillation reduction after the change of a bus signal from dominant bus state 45 to recessive bus state 46 is able to be achieved by the third exemplary embodiment.

All previously described developments of devices 13, 25, 321 for transmitter/receiver devices 12, 22, 32 of user stations 10, 20, 30, 100 of bus system 1 and the methods executed therein according to the exemplary embodiments and their modifications are able to be used individually or in all possible combinations. In particular, the following modifications are possible in addition.

The previously described bus system 1 according to the exemplary embodiments and/or their modifications is described on the basis of a bus system which is based on the CAN protocol. However, bus system 1 according to the exemplary embodiments and/or their modifications may also be some other type of communications network. It is advantageous but not an obligatory prerequisite that an exclusive, collision-free access of a user station 10, 20, 30, 100 to bus 40 or to a shared channel of bus 40 be ensured at least for certain periods of time.

In particular, bus system 1 according to the exemplary embodiments and/or their modifications is a CAN network or a CAN-HS network or a CAN FD network or a FlexRay network. As an alternative, however, bus system 1 could also be a different serial communications network.

In particular, oscillation reduction unit 15, 150 is able to be used in LVDS (low voltage differential signaling), which is an interface standard for a highspeed data transmission in which a transmitter and a receiver are connected to each other via a data transmission path. LVDS is standardized according to ANSI/TIA/EIA-644-1995.

The number and the placement of user stations 10, 20, 30, 100 in bus system 1 according to the exemplary embodiments and/or their modifications are able to be chosen as desired. In particular, only user stations 10 or user stations 20 or user stations 30 or user stations 100 may be available in bus systems 1 of the exemplary embodiments and/or their modifications.

The functionality of the afore-described exemplary embodiments and/or their modifications is able to be implemented in a transceiver or a transmitter/receiver device 12 or transceiver or a CAN transceiver or a transceiver chip set or a CAN transceiver chip set, etc., as illustrated by way of example for transmitter/receiver device 32. In addition or as an alternative, the functionality of the previously described exemplary embodiments and/or their modifications is able to be integrated into existing products. In particular, it is possible for the respective functionality to be realized either in the transceiver as a separate electronic component (chip) or to be embedded in an integrated comprehensive approach in which only one electronic component (chip) is present. It is alternatively possible to develop device 13, 25, 321 and an oscillation reduction unit 133 as a fully autonomous chip.

What is claimed is:

1. A device for a transmitter/receiver device of a bus system, the device comprising:
   a measuring unit configured to measure a minimum recessive bit time that occurs in an operation of the bus system in a message received by the device from a bus of the bus system, a voltage state of the message having been actively driven by a transmitter/receiver device of one of at least two user stations of the bus system; and
   a calculation unit configured to calculate a power-on period based on the minimum recessive bit time supplied by the measuring unit, the power-on period being a time period for which an oscillation reduction unit is to be switched on, which is used for reducing oscillations on the bus that occur after a transition between different voltage states of a bus signal transmitted on the bus;
   wherein the measuring unit is configured to carry out the measuring during on ongoing operation of the bus system, and the calculation unit is configured to subsequently perform the calculating during an ongoing operation of the bus system to reduce the oscillations on the bus by a dynamic adaptation of the power-on period.

2. The device as recited in claim 1, wherein the measuring unit is configured to measure the minimum recessive bit time in a continuous manner or at predefined intervals.

3. The device as recited in claim 1, wherein the measuring unit is configured to carry out a plausibility check of the measured minimum recessive bit time.

4. The device as recited in claim 3, wherein the measuring unit is configured to determine bus loading to check whether or not the measured minimum recessive bit time.

5. The device as recited in claim 1, wherein the measuring unit is configured to provide the minimum recessive bit time for the calculation unit, which is selected as a function of which one of the user stations has won arbitration on the bus.

6. The device as recited in claim 1, wherein: (i) the measuring unit is configured to have a value available for the minimum recessive bit time in the event that a user station which is associated with the measuring unit transmits itself, and to have a value available for the minimum recessive bit time in the event that another of the user stations of the bus system transmits, or (ii) the measuring unit is developed to have a value for the minimum recessive bit time available for each communications relation to the user stations of the bus system.

7. The device as recited in claim 1, wherein the measuring unit is configured to have a separate value available for the minimum recessive bit time for each identifier transmitted on the bus of the bus system.

8. The device as recited in claim 1, wherein the measuring unit is configured to have a value for the minimum recessive bit time available for at least two communications phases of a message and to forward the value to the calculation unit.

9. A user station for a bus system, comprising:
a device including a measuring unit configured to measure a minimum recessive bit time that occurs in an operation of the bus system in a message received by the device from a bus of the bus system, a voltage state of the message having been actively driven by a transmitter/receiver device of one of at least two user stations of the bus system, and a calculation unit configured to calculate a power-on period based on the minimum recessive bit time supplied by the measuring unit, the power-on period being a time period for which an oscillation reduction unit is to be switched on, which is used for reducing oscillations on the bus that occur after a transition between different voltage states of a bus signal transmitted on the bus, wherein the measuring unit is configured to carry out the measuring during on ongoing operation of the bus system, and the calculation unit is configured to subsequently perform the calculating during an ongoing operation of the bus system to reduce the oscillations on the bus by a dynamic adaptation of the power-on period;
a transmitter/receiver device configured to transmit a signal to the bus of the bus system, the transmitter/receiver device being configured to actively drive a state of the signal; and
the oscillation reduction unit configured to reduce oscillations on the bus that occur after a transition between different voltage states of a bus signal that forms on the bus;
wherein the device is configured to output the ascertained time period to the oscillation reduction unit so that the oscillation reduction unit is switched on for the ascertained time period.

10. The user station as recited in claim 9, wherein the device is configured so that the oscillation reduction unit is activated only when the transmitter/receiver device transmits a message to the bus.

11. A bus system, comprising:
a bus; and
at least two user stations which are connected to each other via the bus in such a way that they are able to communicate with each other, wherein at least one of the user stations includes:
a device including a measuring unit configured to measure a minimum recessive bit time that occurs in an operation of the bus system in a message received by the device from a bus of the bus system, a voltage state of the message having been actively driven by a transmitter/receiver device of one of at least two user stations of the bus system, and a calculation unit configured to calculate a power-on period based on the minimum recessive bit time supplied by the measuring unit, the power-on period being a time period for which an oscillation reduction unit is to be switched on, which is used for reducing oscillations on the bus that occur after a transition between different voltage states of a bus signal transmitted on the bus, wherein the measuring unit is configured to carry out the measuring during on ongoing operation of the bus system, and the calculation unit is configured to, subsequently to the measuring during the ongoing operation of the bus system, perform the calculating during an ongoing operation of the bus system to reduce the oscillations on the bus by a dynamic adaptation of the power-on period;
a transmitter/receiver device configured to transmit a signal to the bus of the bus system, the transmitter/receiver device being configured to actively drive a state of the signal; and
the oscillation reduction unit configured to reduce oscillations on the bus that occur after a transition between different voltage states of a bus signal that forms on the bus;
wherein the device is configured to output the ascertained time period to the oscillation reduction unit so that the oscillation reduction unit is switched on for the ascertained time period.

12. A method for a transmitter/receiver device of a bus system, the method comprising the following steps:
measuring, using a measuring unit of a device for the transmitter/receiver device, a minimum recessive bit time that occurs during operation of the bus system in a message received by the device from a bus of the bus system, a voltage state of the message having been actively driven by a transmitter/receiver device of one of at least two user stations of the bus system; and
calculating, using a calculation unit of the device, a power-on period based on the the minimum recessive bit time supplied by the measuring unit, the power-on period being a time period for which an oscillation reduction unit is to be switched on, which is used for reducing oscillations on the bus that occur after a transition between different voltage states of a bus signal transmitted on the bus;
wherein the measuring unit carrying out the measuring during an ongoing operation of the bus system, and the calculation unit subsequently carrying out the calculating during an ongoing operation of the bus system to reduce the oscillations on the bus by a dynamic adaptation of the power-on period.

* * * * *